(12) United States Patent
Okazawa et al.

(10) Patent No.: US 7,448,056 B2
(45) Date of Patent: Nov. 4, 2008

(54) DISC CARTRIDGE

(75) Inventors: Hironori Okazawa, Osaka (JP);
Teruyuki Takizawa, Osaka (JP);
Kuniko Nakata, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 269 days.

(21) Appl. No.: 10/595,636

(22) PCT Filed: Nov. 8, 2004

(86) PCT No.: PCT/JP2004/016547

§ 371 (c)(1),
(2), (4) Date: May 2, 2006

(87) PCT Pub. No.: WO2005/045839

PCT Pub. Date: May 19, 2005

(65) Prior Publication Data

US 2007/0074239 A1    Mar. 29, 2007

(30) Foreign Application Priority Data

Nov. 10, 2003  (JP) .............................. 2003-379304

(51) Int. Cl.
*G11B 23/03* (2006.01)
(52) U.S. Cl. ....................... 720/741; 720/740
(58) Field of Classification Search .......... 720/741, 720/740, 738
See application file for complete search history.

(56) References Cited

U.S. PATENT DOCUMENTS 5,917,803 A  6/1999  Goto et al.

(Continued)

FOREIGN PATENT DOCUMENTS

JP  64-019572  1/1989

(Continued)

OTHER PUBLICATIONS

Copending U.S. Appl. No. 11/355,520.

(Continued)

*Primary Examiner*—Tianjie Chen
(74) *Attorney, Agent, or Firm*—Renner, Otto, Boisselle & Sklar, LLP (57) ABSTRACT

The disc cartridge of the present invention includes a cartridge body 11, 12, shutters 21, 22, disc holding portions and a stopper member 23. The cartridge body has a disc window 12w and a bottom 11u and stores a disc 100 in a rotatable state with one side exposed through the disc window. A bottom window 11c, 11h is opened through the bottom so as to get the disc chucked and to allow a head to access it. The shutters 21, 22 open or shut the bottom window 11c, 11h. A rotational member 25 is supported by the cartridge body 11, 12 to be rotatable and interlocked with the shutters 21, 22 so as to open and close the shutters 21, 22 by rotating. The disc holding portions 21d, 22c, 22d interlock with the shutters 21, 22 opening or closing to hold or release the disc 100. The stopper member 23 is supported by the cartridge body to take a position protruding into the disc window 12w or a non-protruding position. The disc holding portions 21d, 22c, 22d interlock with the stopper member 23, and release the disc 100 when the stopper member 23 takes the position not protruding into the disc window 12w.

22 Claims, 6 Drawing Sheets

U.S. PATENT DOCUMENTS

| | | |
|---|---|---|
| 6,728,201 B2 | 4/2004 | Takizawa et al. |
| 6,782,201 B2 | 4/2004 | Takizawa et al. |
| 6,782,548 B2 | 8/2004 | Takizawa et al. |
| 6,831,813 B2 | 12/2004 | Takizawa et al. |
| 6,910,219 B2 | 6/2005 | Okazawa et al. |
| 6,971,117 B2 * | 11/2005 | Okazawa et al. ............ 720/738 |
| 6,983,477 B2 | 1/2006 | Takizawa et al. |
| 7,007,291 B2 | 2/2006 | Saji et al. |
| 2003/0112738 A1 | 6/2003 | Takizawa et al. |
| 2004/0148624 A1 * | 7/2004 | Inoue ......................... 720/741 |
| 2004/0205809 A1 * | 10/2004 | Saji et al. .................... 720/741 |
| 2005/0018333 A1 | 1/2005 | Okazawa et al. |
| 2005/0081234 A1 * | 4/2005 | Shiga ......................... 720/741 |
| 2005/0120365 A1 * | 6/2005 | Takizawa et al. ............ 720/741 |
| 2005/0160446 A1 | 7/2005 | Okazawa et al. |
| 2005/0183108 A1 | 8/2005 | Okazawa et al. |
| 2005/0204377 A1 * | 9/2005 | Oishi ......................... 720/741 |
| 2005/0257233 A1 | 11/2005 | Okazawa et al. |
| 2005/0257234 A1 | 11/2005 | Takizawa et al. |
| 2005/0273801 A1 * | 12/2005 | Funawatari et al. ......... 720/741 |

FOREIGN PATENT DOCUMENTS

| | | |
|---|---|---|
| JP | 09-153264 | 6/1997 |
| JP | 09-282833 | 10/1997 |
| WO | 97/11463 | 3/1997 |
| WO | 03/077252 | 9/2003 |

OTHER PUBLICATIONS

Copending U.S. Appl. No. 10/528,952.
Copending U.S. Appl. No. 11/355,520 (copy provided).
Copending U.S. Appl. No. 10/528,952 (copy provided).

* cited by examiner

DISC CARTRIDGE

TECHNICAL FIELD

The present invention relates to a disc cartridge for storing a disklike information storage medium such as an optical disc or a magnetic disk therein in a rotatable state.

BACKGROUND ART

Various disc cartridges have been proposed so as to store disklike information storage media therein.

For example, Patent Document No. 1 discloses a disc cartridge in which a disklike storage medium having a single or double information storage sides (which will be referred to herein as a "disc" simply) is completely enclosed in a disc storage space. The disc storage space is defined inside a cartridge body that is made up of upper and lower halves. The cartridge body has chucking windows and a head window. The chucking windows allow the turntable of a spindle motor and a damper to chuck a disc inserted, while the head window allows a head to read and/or write information from/on the disc. These windows form one continuous window. Accordingly, to prevent dust from entering the cartridge body and to prevent the disc from being soiled with finger marks, a shutter is provided for these windows.

Patent Document No. 1: Japanese Patent Application Laid-Open Publication No. 9-153264

Patent Document No. 2: Pamphlet of PCT International Application Publication No. WO 97/11463

DISCLOSURE OF THE INVENTION

Problems to be Solved by the Invention

A disc cartridge having such a structure, however, is supposed to be subjected to read and write operations by inserting a disc, which is still stored in the disc cartridge, into a disc drive. That is why the disc storage space, defined between the upper and lower halves, should be thick enough to cope with the expected flutter or warp of the disc being rotated and an error that may occur in positioning the cartridge in the disc drive. Thus, the cartridge body thereof must be thick, which is a problem.

Also, the lower half is provided with a window for the turntable of the spindle motor and a head window, while the upper half is provided with another window for the clamper. Thus, to close these three windows up at a time, the shutter needs to be formed in a U-shape that covers both the upper and lower halves alike. However, a shutter of such a shape is not so cheap to make, thus raising the overall manufacturing cost of the disc cartridge.

Furthermore, when stored in a cartridge, an optical disc with no hub, e.g., a CD or a DVD, is normally not fixed, and movable freely, inside the cartridge. Accordingly, if the disc is shaken so much, the information storage side of the disc may get scratched. Or the disc may contact with the inner walls of the cartridge to stir up fine particles, which could be deposited on the disc.

Patent document No. 2 also discloses a disc cartridge for storing a disc in a cartridge body. In this disc cartridge, by turning an opening/closing lid, a disc inserting/removing window is opened, thus allowing the user to remove the disc. However, it is not easy to unlock and open the opening/closing lid. In addition, the disc inserting/removing window is so narrow that the disc being inserted or removed may contact with portions surrounding the inserting/removing window and possibly get scratched.

Disclosure of Invention

In order to overcome the problems described above, an object of the present invention is to provide a disc cartridge that can hold a disc without moving it and that allows the user to remove the disc easily without scratching it.

A disc cartridge according to the present invention includes a cartridge body including a disc storage portion and a bottom window. The disc storage portion has a disc window and a bottom and stores a disc, having first and second sides, therein so that the disc is rotatable there and that the first side is exposed through the disc window. The bottom window is opened through the bottom of the disc storage portion so as to get the disc chucked externally and to allow a head, which reads and/or writes information, to access the second side of the disc. The disc cartridge further includes: at least one shutter, provided on the bottom of the disc storage portion, for opening or shutting the bottom window; a rotational member, which is supported by the cartridge body so as to be rotatable therein and is interlocked with the shutter so as to open and close the shutter by rotating itself; a disc holding portion for interlocking with the shutter that is opening or closing so as to hold the disc onto either the shutter or the cartridge body when the shutter shuts the bottom window and to release the disc when the shutter opens the bottom window; and a stopper member, which is supported by the cartridge body so as to be movable from a position protruding into the disc window to a position not protruding into the disc window, or vice versa. The disc holding portion interlocks with the stopper member, and releases the disc when the stopper member has moved to the position not protruding into the disc window.

In one preferred embodiment, the stopper member and the rotational member interlock together, thereby interlocking the disc holding portion and the stopper member with each other.

In another preferred embodiment, the disc cartridge further includes a coupling member for interlocking the stopper member and the rotational member together.

In another preferred embodiment, the coupling member includes first and second engaging portions to engage with the stopper member and the rotational member, respectively, and the second engaging portion contacts and engages with the rotational member while the stopper member is moving.

In another preferred embodiment, the first engaging portion of the coupling member is supported by the stopper member so as to be rotatable.

In another preferred embodiment, the coupling member is positioned such that the second engaging portion of the coupling member does not contact with the rotational member while the stopper member is protruding into the disc window.

In another preferred embodiment, the second engaging portion of the coupling member has a pin portion, and the cartridge body has a groove portion, which fits with the pin portion to define a direction in which the second engaging portion moves.

In another preferred embodiment, the cartridge body has a removal history hole, which is cut through the cartridge body, and a columnar cap member, which covers the removal history hole at least partially and which is attached to, but readily removable from, the cartridge body. The stopper member has a hole to which the cap member is inserted.

In another preferred embodiment, the disc cartridge further includes a locking member for locking the rotational member onto the cartridge body while the shutter closes the bottom window.

In another preferred embodiment, the stopper member and the locking member interlock together so as to make the locking member unlock the rotational member by moving the stopper member.

In another preferred embodiment, the stopper member and the rotational member interlock together, thereby interlocking the disc holding portion and the stopper member with each other.

In another preferred embodiment, the disc cartridge further includes a coupling member for interlocking the stopper member and the rotational member together.

In another preferred embodiment, the coupling member includes first and second engaging portions to engage with the stopper member and the rotational member, respectively, and the second engaging portion contacts and engages with the rotational member while the stopper member is moving.

In another preferred embodiment, the first engaging portion of the coupling member is supported by the stopper member so as to be rotatable.

In another preferred embodiment, the coupling member is positioned such that the second engaging portion of the coupling member does not contact with the rotational member while the stopper member is protruding into the disc window.

In another preferred embodiment, the second engaging portion of the coupling member has a pin portion, and the cartridge body has a groove portion, which fits with the pin portion to define a direction in which the second engaging portion moves.

In another preferred embodiment, while the stopper member is not protruding into the disc window, the disc holding portion does not protrude into the disc window, either.

In another preferred embodiment, the stopper member either turns or slides with respect to the cartridge body, thereby taking the position protruding into the disc window or the position not protruding into the disc window.

In another preferred embodiment, the disc cartridge includes two shutters including the at least one shutter, and the disc holding portion is provided for each of the two shutters.

In another preferred embodiment, the disc holding portions hold the disc by pressing at least outer peripheral portions of the second side of the disc against the bottom of the disc storage portion.

In another preferred embodiment, the stopper member is provided so as to be attachable and removable to/from the cartridge body.

In another preferred embodiment, the locking member is provided so as to be attachable and removable to/from the cartridge body.

Effects of the Invention

According to the present invention, the disc holding portion can firmly hold the disc so as not to make the disc move inconstantly. Thus, even while the disc is being inserted into the disc cartridge, the disc never gets scratched. In addition, the stopper member interlocks with the disc holding portion such that the disc holding portion releases the disc while the stopper member is being moved so as not to protrude into the disc window. In this manner, the disc can be removed through the disc window without getting it scratched.

BEST MODE FOR CARRYING OUT THE INVENTION

Embodiment 1

Hereinafter, a first preferred embodiment of a disc cartridge according to the present invention will be described. First, the overall structure of this disc cartridge 301 will be outlined with reference to FIGS. 1 and 2.

Figure 1:
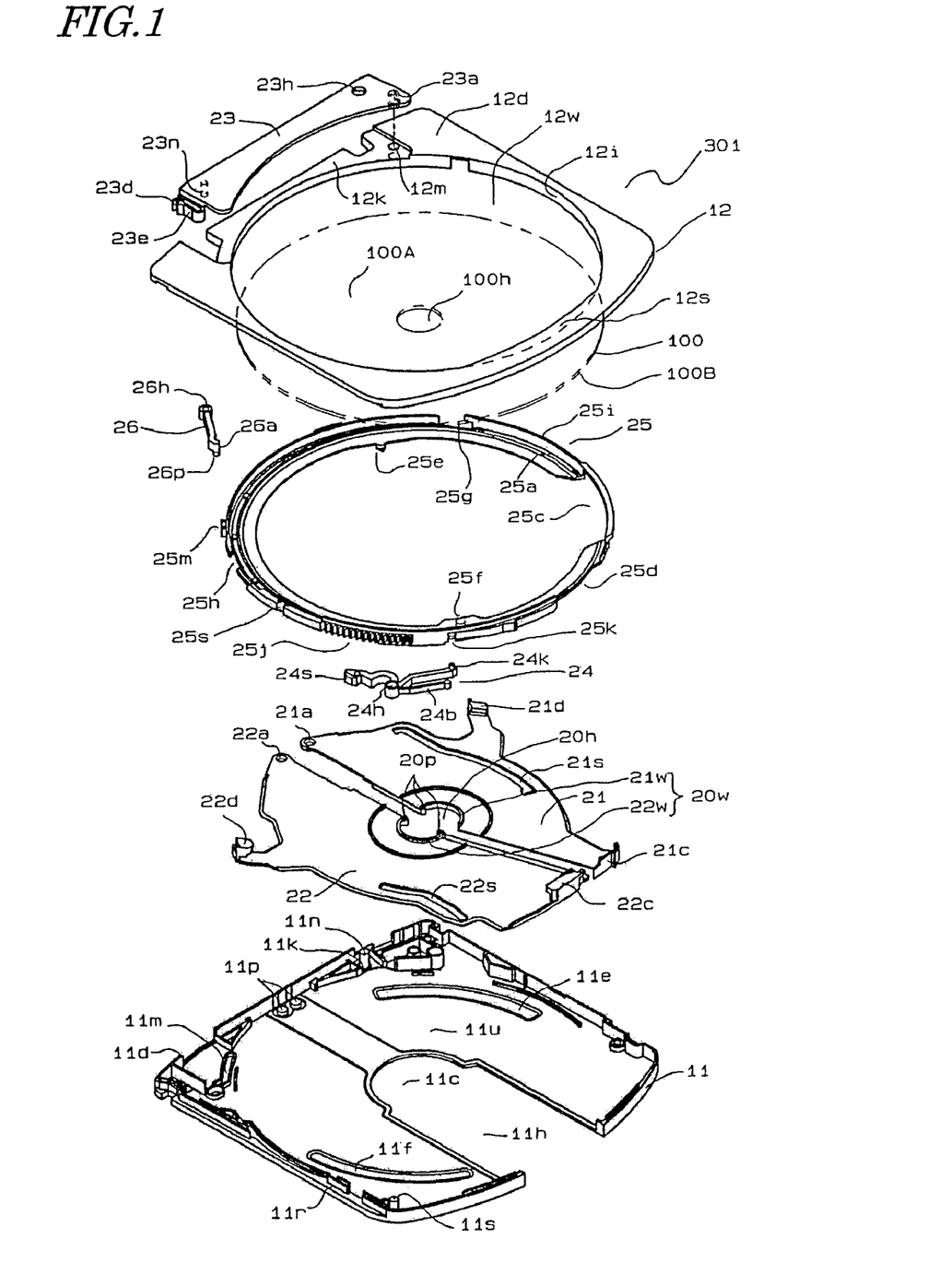
FIG. 1 is an exploded perspective view illustrating the structure of a disc cartridge according to a first preferred embodiment of the present invention.

The disc cartridge 301 includes a cartridge lower shell 11, a cartridge upper shell 12, a first shutter 21, a second shutter 22, a stopper member 23, a locking member 24, a rotational member 25 and a coupling member 26. These members may be made of a synthetic resin, for example. However, there is no need to make all of these members of the same material. Instead, best materials may be selected for these members in view of the mechanical strengths or appearance required for them.

The cartridge lower shell 11 has an inner lower surface 11u. The inner lower surface 11u has a chucking window 11c and a head window 11h. The chucking window 11c allows a chucking member (e.g., a spindle motor for rotating the disc 100) to enter the disc cartridge 301 externally. The head window 11h allows a head, which reads and/or writes information, to enter the disc cartridge 301 and access a target location on the disc 100. The head window 11h is continuous with the chucking window 11c to form a bottom window, and also reaches one side surface of the cartridge lower shell 11. Also, a recess 11r is provided on another side surface of the cartridge lower shell 11, which is adjacent to the side surface with the head window 11h.

As will be described in detail later, the inner lower surface 11u has two grooves 11e and 11f that receive the respective ends of raised portions 25e and 25f provided for the rotational member 25. These grooves 11e and 11f preferably do not reach the bottom of the inner lower surface 11u. The inner lower surface 11u further has another groove 11m to receive the pin portion 26p of the coupling member 26. The groove 11m preferably does not reach the bottom of the inner lower surface 11u, either. The inner lower surface 11u further includes a pair of rotation shafts 11p that fits with rotation holes 21a and 22a provided for the first and second shutters 21 and 22, respectively. In this preferred embodiment, the rotation holes 21a and 22a are opened through the first and second shutters 21 and 22 and rotation shafts 11p are provided on the cartridge lower shell 11. Alternatively, the rotation shafts may be provided on the first and second shutters 21 and 22 and rotation holes may be opened through the cartridge lower shell 11. Also, the inner lower surface 11u further has a removal history hole 11k for checking if the disc has ever been removed and a cap member 11n that closes the removal history hole 11k. The cap member 11n is connected to the removal history hole 11k at a strength that is low enough to pull it off easily.

The cartridge upper shell 12 includes a circular disc window 12w, which expands over the entire projection area of the disc 100. The disc window 12w is defined by a cylindrical side surface 12i. The disc 100 can be inserted into, and removed from, the disc cartridge 301 through this disc window 12w.

The cartridge upper and lower shells 12 and 11 are adhered, ultrasonic-welded or joined (e.g., screwed up) together around their outer periphery, thereby forming a cartridge body. Also, the inner lower surface 11u of the cartridge lower shell 11 and the side surface 12i of the cartridge upper shell 12 together define a disc storage portion for storing the disc 100 therein.

In the disc storage portion, the space defined by the side surface 12i is wide enough to allow the disc 100 to rotate freely therein without contacting with the side surface 12i. The top of the disc storage portion is opened as the disc window 12w, and the first side 100A of the disc 100 stored in the disc storage portion is exposed entirely through the disc window 12w. On the other hand, the second side 100B, i.e., the information storage side of the disc 100, faces the inner lower surface 11u.

A stopper member 12s is provided as an integral part of the upper surface 12d of the cartridge upper shell 12 so as to expand into the window 12w. The stopper member 12s and another stopper member 23 (to be described later) are used to prevent the disc 100, stored in the disc storage portion of the cartridge body, from dropping down through the disc window 12w.

These stopper members 12s and 23 are particularly effective when this disc cartridge is loaded into a vertically mounted disc drive. Optionally, three or more stopper members may be provided and/or each of the stopper members may be formed in any other shape or provided at any position other than that shown in FIG. 1.

By adopting such a structure, the cartridge 301 can be thinner than a conventional cartridge in which both sides of the disc are covered. In addition, the label side of the disc can be displayed through the disc window 12w and the operator can check the contents of the disc that were printed on the label side (i.e., the first side) 100A. Moreover, by displaying the design of the label side, the disc cartridge including the disc can also have a good design.

The first and second shutters 21 and 22 are provided on the inner lower surface 11u of the cartridge lower shell 11. When the disc 100 is stored in the disc cartridge 301, the first and second shutters 21 and 22 are located between the information storage side (i.e., the second side) 100B of the disc 100 and the inner lower surface 11u. The first and second shutters 21 and 22 have the rotation holes 21a and 22a, respectively, which are inserted into the rotation shafts 11p of the cartridge lower shell 11. Thus, the first and second shutters 21 and 22 rotate on the rotation shafts 11p, thereby opening or shutting the head and chucking windows 11h and 11c. When the first and second shutters 21 and 22 are opened, the second side 100B of the disc 100 is partially exposed through the head window 100h.

The first and second shutters 21 and 22 are provided with notches so as to define a hole 20h in a region that overlaps with the center hole 100h of the disc 100 stored in the cartridge body when the first and second shutters 21 and 22 close the bottom window. The notches of the first and second shutters 21 and 22 are surrounded with raised portions 21w and 22w, respectively. When the first and second shutters 21 and 22 are closed, these raised portions 21w and 22w are in close contact with each other, thereby forming a raised portion 20w that is adjacent to the inner circumference of the center hole 100h of the disc 100. The raised portion 20w prevents dust from reaching the information storage side 100B of the disc 100 by way of the center hole 100h. Furthermore, the raised portions 21w and 22w have three protrusions 20p beside the hole 20h. That is to say, the top of the protrusions 20p is higher than that of the raised portions 21w and 22w. While the first and second shutters 21 and 22 are opening or closing, the protrusions 20p contact with a non-information storage area of the second side 100B (i.e., the information storage side) of the disc 100, thereby lifting the disc upward. In this manner, it is possible to prevent the raised portion 20w from contacting with, and scratching, the information storage area of the second side 100B while the shutters are opening or closing.

Also, the first shutter 21 includes a disc holding portion 21d, while the second shutter 22 includes disc holding portions 22c and 22d. Each of these disc holding portions has a downwardly tapered slope, which faces the bottom of the disc storage portion. When the first and second shutters 21 and 22 are closed, the disc holding portions 21d, 22c and 22d protrude into the disc storage portion and their slopes contact with the outer periphery of the first side 100A of the disc 100. In this manner, the disc 100 can be held or fixed firmly by pressing at least a portion of the disc 100 around the outer periphery of the second side 100B toward the bottom of the disc holding portions.

Another raised portion 21c is provided at the end of the first shutter 21. While the first and second shutters 21 and 22 are closed, the raised portion 21c prevents the side surface of the disc 100 from being exposed through the chucking window 11h that reaches the side surface of the cartridge lower shell 11.

As will be described in detail later, the first and second shutters 21 and 22 include guide grooves 21s and 22s that respectively engage with the raised portions 25e and 25f of the rotational member 25. The guide grooves 21s and 22s extend vertically through the first and second shutters 21 and 22, respectively, so that the raised portions 25e and 25f of the rotational member 25 can reach the bottom.

The rotational member 25 includes a sidewall 25i and a disc receiving portion 25a that is connected to the bottom of the sidewall 25i. The sidewall 25i has a cylindrical shape and has such a size as to surround the side surface of the disc 100 stored. The sidewall 25i is discontinued by three notches 25d, 25g and 25h. The disc receiving portion 25a has a flat ring shape including a notch 25c. As the rotational member 25 rotates, the first and second shutters 21 and 22 are opened. At this time, the rotational member 25 has such an angle of rotation as to match the notch 25c with the head window 11h.

While the first and second shutters 21 and 22 are closed, the disc holding portions 21d, 22d, 21c and 22c protrude through the notches 25g, 25h and 25d toward the disc receiving portion 25a, thereby holding the disc 100 thereon. Convex portions 25e and 25f, which protrude toward the cartridge lower shell 11, are provided on the lower surface of the disc receiving portion 25a. Furthermore, a recess 25s and a gear 25j, which interlock with the shutter opening/closing mechanism of a disc drive, are provided on the outer side surface of the sidewall 25i. The recess 25s and the gear 25j are exposed through a window, which is opened at the bottom of a side recess 11r, according to the angle of rotation of the rotational member 25. Also, outside of the sidewall 25i, provided are an engaging window 25k to fit with the locking end portion 24k of the locking member 24 to be described later and a recess 25m to engage with the raised portion 26a of the coupling member 26 to be described later.

The locking member 24 locks the rotational member 25 up such that the rotational member 25 will not rotate. The rotation hole 24h of the locking member 24 is inserted into the rotation shaft 11s provided on the cartridge lower shell 11 such that the locking member 24 is supported on the rotation shaft 11s so as to be rotatable freely. Also, a spring portion 24b contacts with the inner side surface of the cartridge lower shell 11, thereby applying elastic force to the locking end portion 24k toward the engaging window 25k of the rotational member 25. Furthermore, an unlocking portion 24s is exposed on a side surface of the disc cartridge 301. To unlock the rotational member 25 and make it rotatable, a drive mechanism may press the unlocking portion 24s. By pressing the unlocking portion 24s, the locking member 24 turns around the rotation hole 24h and the locking end portion 24k is disengaged from the engaging window 25k, thereby getting the rotational member 25 unlocked. In this manner, the rotational member 25 is locked by the locking member 24 so as not to rotate. As a result, the first and second shutters 21 and 22, interlocked with the rotational member 25, are also locked while being closed.

In this preferred embodiment, the locking member 24 locks the rotational member 25 up. Alternatively, the locking member 24 may lock one or both of the first and second shutters 21 and 22. As another alternative, a locking member having a removable structure may be provided for the cartridge body 301 and may be removed so as to unlock the rotational member 25 or the first and/or second shutter(s) 21 and/or 22.

The stopper member 23 is provided near a side surface of the cartridge body, consisting of the cartridge upper and lower shells 12 and 11, so as to face another side surface of the cartridge body with the head window 11h. A rotation shaft 23a is provided near one end of the longer side of the stopper member 23, while the other end thereof includes a hooking portion 23d with a spring portion 23e. A hole 23h, to which a cap member 11n is inserted, is also provided.

The cartridge upper shell 12 has a rotation hole 12m to receive the rotation shaft 23a of the stopper member 23. When the rotation shaft 23a is inserted into the rotation hole 12m, the shaft 23 is hooked and secured by a hooking portion provided at the end of the rotation shaft 23a. The cartridge lower shell 11 further has a retaining wall 11d for receiving the hooking portion 23d. The cartridge upper shell 12 further has a recessed portion 12k so that the upper surface of the stopper member 23 is leveled with the upper surface 12d of the cartridge upper shell 12 when the stopper member 23 is attached to the cartridge upper shell 12. The rotation hole 12m is provided in the recessed portion 12k. While the stopper member 23 is protruding into the disc window 12w and over the disc 100 stored, the hooking portion 23d is engaged with the retaining wall 11d, thereby fixing the stopper member 23 onto the cartridge body.

Figure 2:
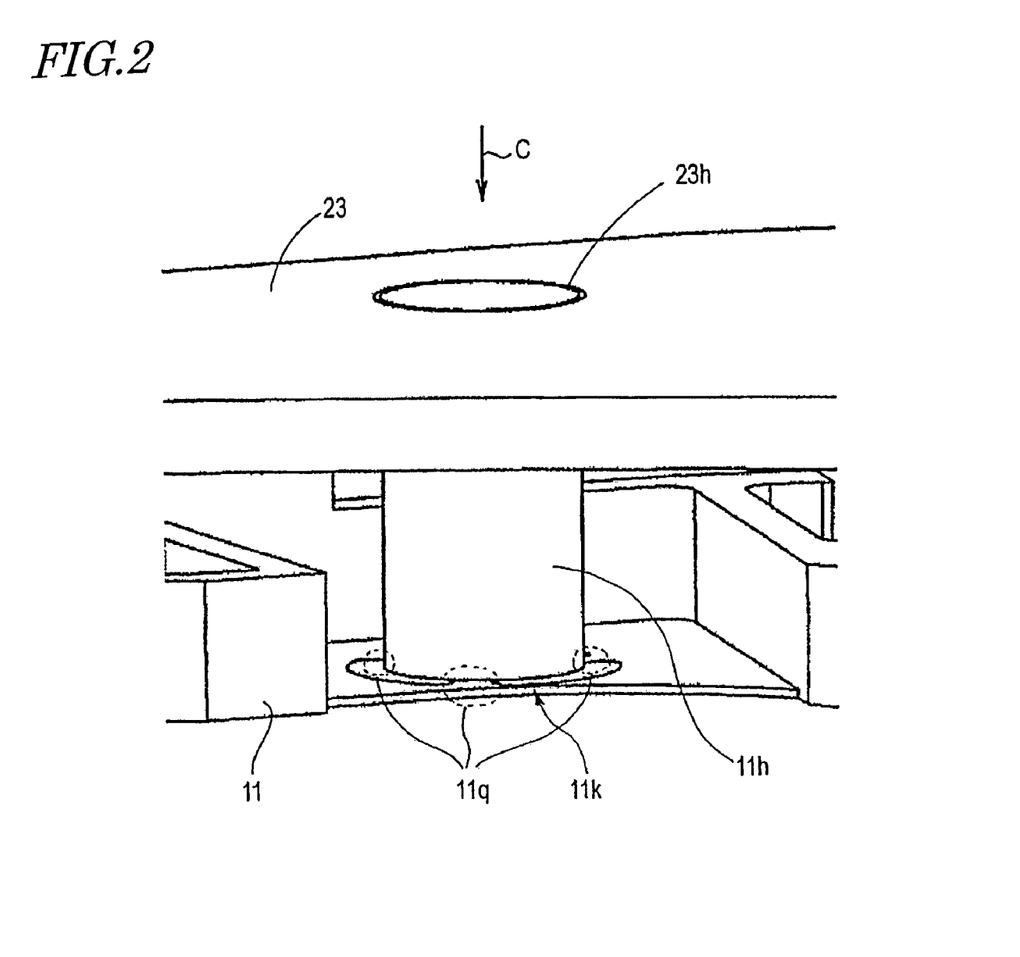
FIG. 2 is a perspective view illustrating the structure of the removal history hole and its surrounding portion of the disc cartridge shown in FIG. 1 on a larger scale.

FIG. 2 illustrates the structure of a portion of the cartridge body near the removal history hole 11k. As described above, the removal history hole 11k of the cartridge lower shell 11 is partially covered with the cap member 11n. The cap member 11n has a columnar shape and is connected to the cartridge lower shell 11 with a thin connecting portion 11q that surrounds the removal history hole 11k. The connecting portion 11q has a small thickness and a narrow width. Accordingly, when the cap member 11n is pressed down strongly in the direction pointed by the arrow C, the connecting portion 11q is broken, thereby removing the cap member 11n from the cartridge body. In other words, the cap member 11n is attached to the cartridge body with the connecting portion 11q so as to be readily removable.

As shown in FIG. 2, the center of the removal history hole 11k matches that of the hole 23h of the stopper member 23, and a part of the cap member 11n is inserted into the hole 23h. That is why as long as the cap member 11n is connected to the cartridge lower shell 11 of the cartridge body with the connecting portion 11q, the cap member 11n prevents the stopper member 23 from moving.

Referring back to FIG. 1, arranged is the coupling member 26 between the stopper member 23 and the cartridge lower shell 11. A rotation hole 26h is provided at one end of the coupling member 26, which functions as a first engaging portion. If the rotation hole 26h is inserted into, and fixed on, the rotation shaft 23n provided on the back surface of the stopper member 23, then the coupling member 26 can turn freely with respect to the stopper member without being disengaged from the stopper member. At the other end of the coupling member 26, which functions as a second engaging portion, provided are a raised portion 26a and a pin portion 26p. The raised portion 26a fits in with a recess 25m provided on the side surface of the rotational member 25, thereby rotating the rotational member 25. On the other hand, the pin portion 26p fits into, and moves along, a groove portion 11m cut through the cartridge lower shell 11.

The respective members of the disc cartridge 301 are assembled together so as to maintain the vertical positional relationship shown in FIG. 1. As a result, the cartridge lower and upper shells 11 and 12 are joined together so that the first and second shutters 21 and 22 are arranged on the cartridge lower shell 11 and that the rotational member 25 is located over the shutters 21 and 22. In such a state, the disc 100 is inserted through the disc window 12w and finally the stopper member 23 is attached, thereby completing the disc cartridge 301.

Hereinafter, the operations of inserting and removing the disc 100 into/from the disc cartridge 301 will be described in detail with reference to FIGS. 3 through 6.

Figure 3:
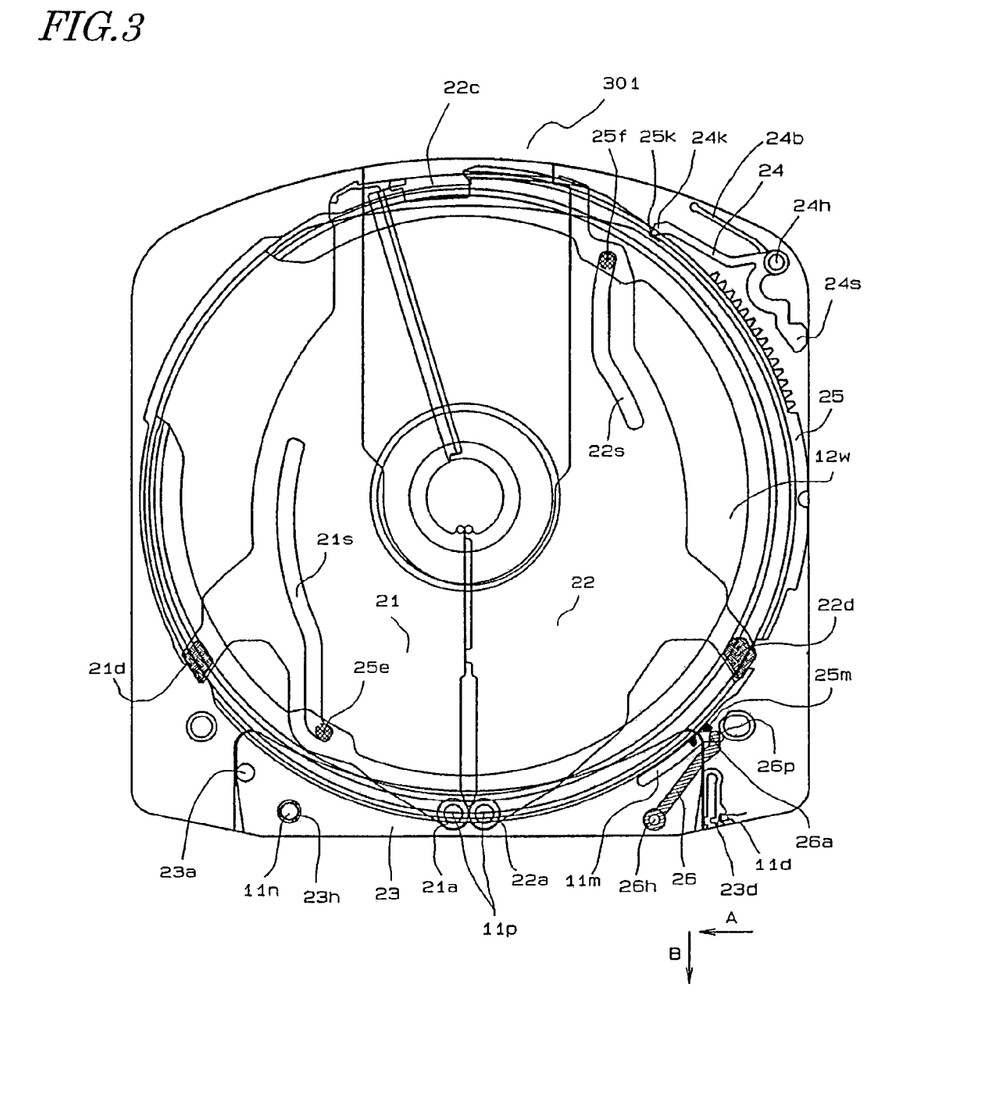
FIG. 3 is a plan view illustrating a state of the disc cartridge shown in FIG. 1 in which the stopper member is closed.
Figure 4:
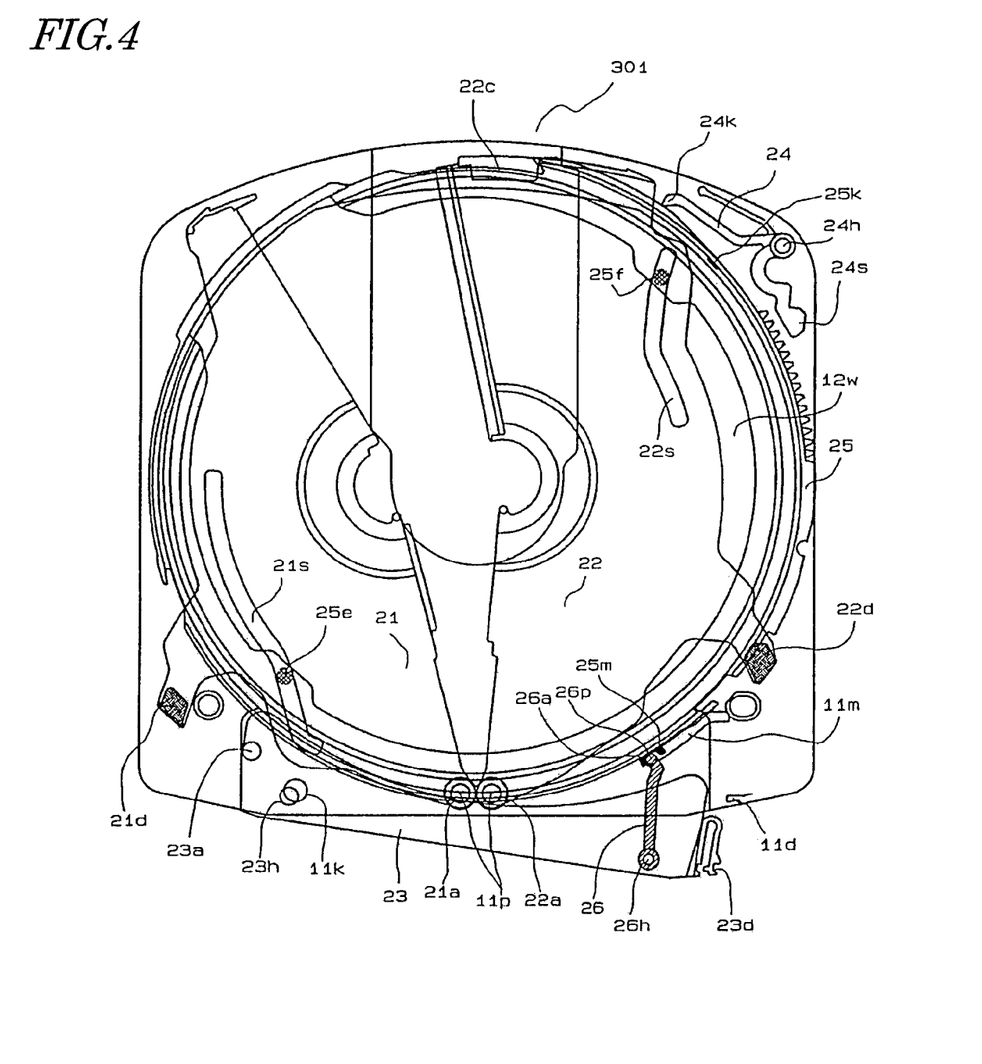
FIG. 4 is a plan view illustrating a state of the disc cartridge shown in FIG. 1 in which the stopper member is opened.
Figure 5:
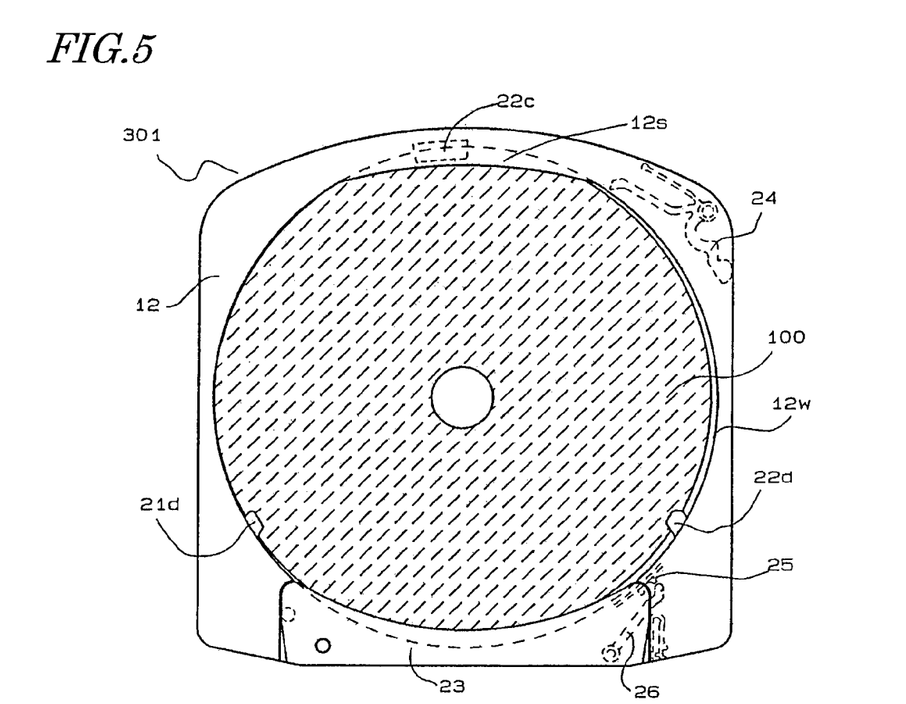
FIG. 5 is a plan view illustrating a state of the disc cartridge shown in FIG. 1 in which the disc is stored and the stopper member is closed.
Figure 6:
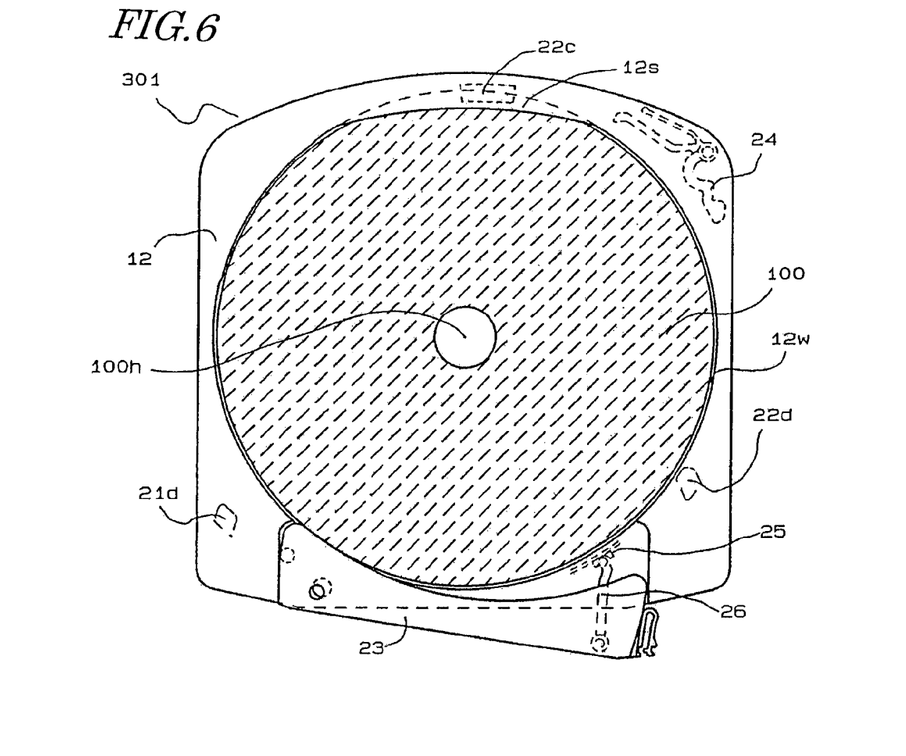
FIG. 6 is a plan view illustrating a state of the disc cartridge shown in FIG. 1 in which the disc is stored and the stopper member is opened.

FIGS. 3 and 5 illustrate a state where the stopper member 23 partially protrudes over the disc window 12w to prevent the disc 100 from dropping down through the disc window 12w. On the other hand, FIGS. 4 and 6 illustrate a state where the stopper member 23 does not protrude over the disc window 12. Among these drawings, no disc 100 is illustrated in FIGS. 3 and 4 to show the structure of the disc cartridge 301 clearly.

In FIG. 3, the first and second shutters 21 and 22 are closed, which state is maintained by the rotational member 25 and the locking member 24. At this point in time, the disc 100 is held and fixed by the disc holding portions 21d, 22d and 22c protruding into the disc storage portion as shown in FIG. 5. More specifically, the slopes of the disc holding portions 21d, 22d and 22c contact with the outer periphery of the disc 100. In this manner, the disc holding portions 21d, 22d and 22c hold the disc 100 with the center of the disc 100 slightly offset from that of the disc storage portion such that while the first and second shutters 21 and 22 are closed, the outer side surface of the disc 100 contacts with the sidewall 12i of the disc storage portion where the notch 25c of the rotational member 25 is located. At the same time, by bringing the slopes of the disc holding portions 21d, 22d and 22c into contact with the outer periphery of the disc 100, the disc 100 is pressed against the bottom of the disc storage portion. In this manner, the disc 100 is fixed onto the first and second shutters 21 and 22 and to the body of the disc cartridge. In addition, by bringing the outer and inner peripheries of the information storage side 100B of the disc into contact with the disc receiving portion 25a of the rotational member 25 and the raised portion 20w of the shutters, the information storage area of the information storage side 100B is sealed such that no dust will be deposited on the information storage area.

A portion of the stopper member 23 is protruding into the disc window 12w and is located over the disc 100. Even so, the disc 100 can still be held and fixed because the first and second shutters 21 and 22 with the disc holding portions 21d, 22d and 22c are kept closed.

First, it will be described with reference to FIG. 3 why the first and second shutters 21 and 22 can be kept closed. The turning of the first shutter 21 is regulated by the rotational member 25 with the raised portion 25e of the rotational member 25 fitted into a guide groove 21s. In the same way, the turning of the second shutter 22 is regulated by the rotational member 25 with the raised portion 25f of the rotational member 25 fitted into another guide groove 22s. On the other hand, the rotational member 25 is also kept from rotating because the locking end portion 24k of the locking member 24 fits in with the engaging window 25k of the rotational member 25. That is why as long as the locking end portion 24k fits in with the engaging window 25k, the first and second shutters 21 and 22 can be kept closed.

Next, it will be described with respect to FIG. 3 again why the stopper member 23 can be kept protruding over the disc 100. The stopper member 23 has the rotation shaft 23a at one end thereof so as to turn freely, but is now kept from turning because the hooking portion 23d at the other end thereof is engaged with the retaining wall 11d of the cartridge lower shell 11. In addition, the cap member 11n of the cartridge lower shell 11 now fits in with the hole 23h of the stopper member 23, thereby keeping the stopper member 23 from turning, too. Consequently, while the hooking portion 23d is engaged with the retaining wall 11d and while the cap member 11n fits in with the hole 23h, the stopper member 23 can be kept protruding over the disc 100 as shown in FIG. 5.

Also, as long as the stopper member 23 is protruding over the disc 100, the raised portion 26a at the end of the coupling member 26 does not contact or fit with the recess 25m of the rotational member 25. That is why even if the disc cartridge 301 were inserted into a disc drive and if the disc drive turned the rotational member 25 to open or close the shutters, the coupling member 26 would have no effects on the rotation operation of the rotational member 25.

Next, the operation of removing the disc 100 from the disc cartridge 301 will be described. First, when the operator presses the cap member 11n with the tip of a pen, for example, the cap member 11n separates from the cartridge lower shell 11 (see FIG. 2). As a result, the removal history hole 11k is now open and the cap member 11n drops through the hole 23h of the stopper member 23.

And when the unlocking portion 24s of the locking member 24 is pressed with a fingertip, for example, the locking member 24 starts to turn around the rotation hole 24h, thereby disengaging the locking end portion 24k from the engaging window 25k of the rotational member 25. Next, if the hooking portion 23d of the stopper member 23 is pulled in the direction B while being bent in the direction A shown in FIG. 3, then the stopper member 23 is unlocked and is now free to turn. As the stopper member 23 turns in this manner, the coupling member 26 also starts to turn around the rotation hole 26h. In the meantime, the pin portion 26p at the end of the coupling member 26 starts to move in the direction A along the groove portion 11m of the cartridge lower shell 11.

As the stopper member 23 further turns, the coupling member 26 also turns and the pin portion 26p also goes farther in the direction A. As a result, the raised portion 26a surrounding the pin portion 26p gets engaged with the recess 25m of the rotational member 25. After that, as the stopper member 23 turns, the pin portion 26p of the coupling member 26 moves along the groove portion 11m, which substantially follows the track of the rotational member 25, while the rotational member 25 rotates clockwise with the raised portion 26a and the recess 25m engaged together.

FIGS. 4 and 6 show a state where the stopper member 23 has turned fully. As the stopper member 23 turns, the rotational member 25 is rotated by way of the coupling member 26, and then the first and second shutters 21 and 22 are turned by way of the rotational member 25. As a result, the first and second shutters 21 and 22 are opened a little. By this point in time, the disc holding portions 21d and 22d have moved to positions not protruding into the disc window 12w.

As shown in FIG. 6, the stopper member 23 is no longer located over the disc 100. Furthermore, the disc holding portions 21d and 22d are not protruding into the disc window 12w, either. Thus, the disc 100 has been released and is not held anymore.

Then, the operator can remove the disc 100 from the disc cartridge 301 by gripping the disc 100 with a finger laid on the center hole 100h thereof and lifting the edge of the disc 100 from around the stopper member 23 on the cartridge upper shell 12.

As described above, unless the cap member 11n is removed, the stopper member 23 cannot turn and the disc 100 cannot be removed, either. When the cap member 11n is pushed out to remove the disc 100, the removal history hole 11k opens. Thus, it can be seen that as long as the removal history hole 11k is closed, no disc 100 has ever been removed but the disc 100 originally stored when the disc cartridge 301 was manufactured is still stored there.

A disc drive to be loaded with this disc cartridge 301 senses the opened or closed state of this removal history hole 11k, thereby controlling the read or write operation in accordance with the result. For example, suppose the disc cartridge 301 manufactured should store a disc to be read from or written to in compliance with only a predetermined standard. The disc drive checks the state of the removal history hole of the disc cartridge 301 loaded. If the disc drive finds the removal history hole 11k closed, the disc drive recognizes the disc stored in the disc cartridge 301 as readable or writable in compliance with the predetermined standard. Then, the disc drive can quickly perform a read or write operation on the disc in compliance with that standard. On the other hand, if the disc drive finds the removal history hole 11k opened, the disc drive senses the disc stored in the disc cartridge as an unknown type. In that case, to recognize the type of the disc that is stored in the disc cartridge, the disc drive radiates a beam including various types of test information toward the disc first. Next, in accordance with the test results, the disc drive reads or writes information from/on the disc under the best conditions.

Next, it will be described how to store the removed disc 100 in the cartridge 301 again. The operator grips the disc 100 with a finger laid on the center hole 100h thereof and sets the disc 100 within the disc window 12w by putting it under the stopper member 12s. Thereafter, the operator turns the stopper member 23 to the original position, thereby getting the hooking portion 23d and the retaining wall 11d engaged with each other. In the meantime, the coupling member 26 turns the rotational member 25 counterclockwise and the rotational member 25 closes the first and second shutters 21 and 22 up. Synchronously, the locking member 24 is turned counterclockwise by the spring portion 24b, thereby engaging the engaging window 25k and the locking end portion 24k with each other and regulating the rotation of the rotational member 25. Consequently, when the first and second shutters 21 and 22 are closed, the disc holding portions 21d and 22d hold the disc 100 thereon.

According to this preferred embodiment, the disc 100 can be removed from the disc cartridge 301 just by pressing the locking member 24 and turning the stopper member 23. In this case, the stopper member 23 and the disc holding portions of the shutters interlock with each other by way of the coupling member 26 and the rotational member 25. That is to say, while the stopper member 23 is being turned so as not to protrude into the disc window, the disc holding portions release the disc. As a result, the disc 100 can be removed through the disc window 12w without getting scratched.

Also, in storing the removed disc 100 back in the disc cartridge 301 again, the disc 100 is introduced through the disc window 12w into the cartridge body and the stopper member 23 is turned to its original position. In this manner, the disc 100 can be inserted into the disc cartridge 301 successfully. In this case, while the stopper member 23 is being turned so as to protrude into the disc window, the disc holding portions fix the disc 100. That is why the disc does not get scratched, either, while being inserted into the disc cartridge. Furthermore, since the disc is fixed in the disc cartridge, the disc never moves inconstantly or stirs up fine particles in the cartridge.

Embodiment 2

Hereinafter, a second preferred embodiment of a disc cartridge according to the present invention will be described. The disc cartridge of this preferred embodiment also has a structure for increasing the handiness by making the disc removable more easily. However, this second preferred embodiment is quite different from the first preferred embodiment in the position of the stopper member and in that there is no need to press the locking member during the operation of removing the disc. Thus, these features will be described in detail. Each member of the second preferred embodiment, having the same function as the counterpart of the first preferred embodiment, is identified by the same reference numeral as that used for the first preferred embodiment.

Figure 7:
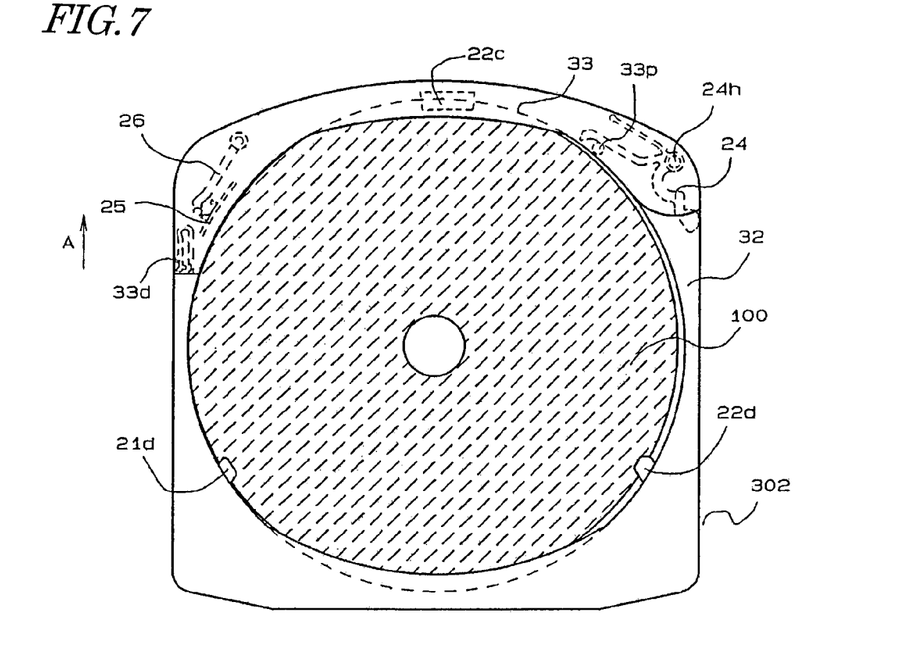
FIG. 7 is a plan view illustrating a state of a disc cartridge according to a second preferred embodiment of the present invention in which the disc is stored and the stopper member is closed.
Figure 8:
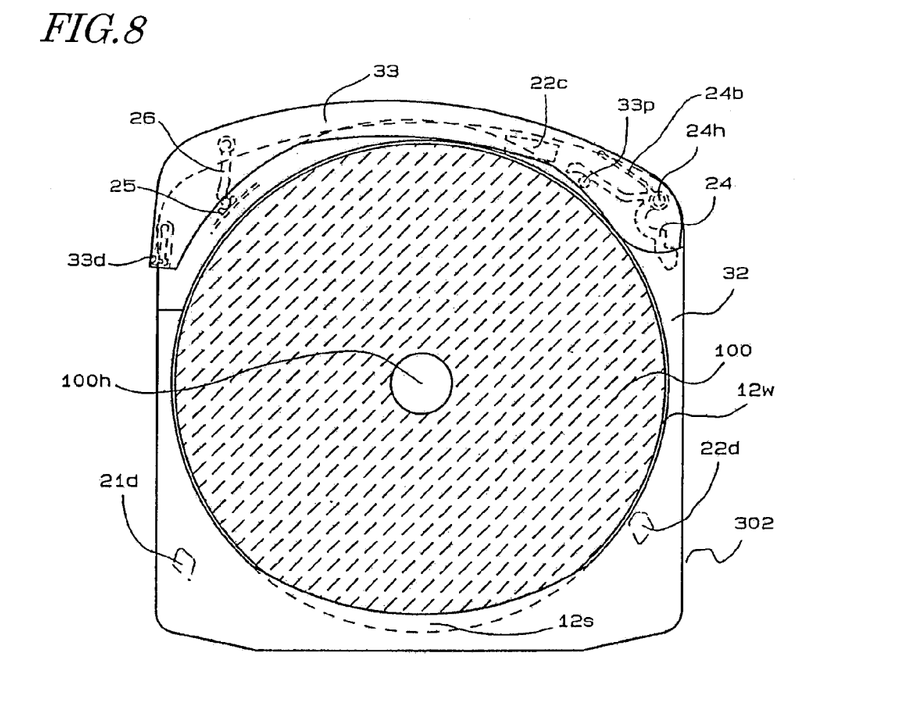
FIG. 8 is a plan view illustrating a state of the disc cartridge of the second preferred embodiment of the present invention in which the disc is stored and the stopper member is opened.

FIG. 7 shows a state where the disc 100 is stored in the disc cartridge 302 of this preferred embodiment. FIG. 8 shows a state where the disc 100 is readily removable.

The stopper member 33 of this preferred embodiment turns around the rotation hole 24h of the locking member 24. That is to say, the stopper member 23 of the first preferred embodiment is replaced with the stopper member 33 that is provided near the head window 11h so as to selectively protrude into the disc window.

Hereinafter, it will be described how to remove the disc 100. The operator disengages the engaging portion 33d of the stopper member 33 from the disc cartridge 302. And if the engaging portion 33d is moved in the direction A, the stopper member 33 turns. As a result, the raised portion 33p of the stopper member 33 contacts with the locking member 24, thereby turning the locking member 24 in an unlocking direction. That is to say, the stopper member 33 and the locking member 24 interlock with each other. As the locking member 24 turns, the rotational member 25 is unlocked.

In the meantime, as the stopper member 33 turns, the rotational member 25 is turned clockwise by the coupling member 26, and the first and second shutters 21 and 22 start to open themselves as the rotational member 25 turns as in the first preferred embodiment described above. Although the coupling member 26 is provided at a different position from the first preferred embodiment, the coupling member 26 has the same structure as the counterpart of the first preferred embodiment. Also, portions of the stopper member 33 and rotational member 25 to interlock with the coupling member 26 have the same structures as the counterparts of the first preferred embodiment described above.

As shown in FIG. 8, the stopper member 33 that has turned fully no longer protrudes over the disc 100. At this point in time, the disc holding portions 21d and 22d doe not protrude into the disc window 12w but are retracted from the disc window 12w. In this manner, the disc 100 is released. Then, as in the first preferred embodiment, the operator can remove the disc 100 from the disc cartridge 302 by gripping the disc 100 with a finger laid on the center hole 100h thereof and lifting the edge of the disc 100 from around the stopper member 33 on the cartridge upper shell 12.

Next, it will be described how to store the removed disc 100 in the cartridge 302 again. The operator grips the disc 100 with a finger laid on the center hole 100h thereof and inserts the disc 100 into the disc storage portion through the disc window 12w by putting it under the stopper member 12s. Thereafter, when the operator turns the stopper member 33 to the original position, the disc is fixed by the hooking portion 33d. In the meantime, the coupling member 26 turns the rotational member 25 counterclockwise and the rotational member 25 closes the first and second shutters 21 and 22 up. Synchronously, the locking member 24 is turned counterclockwise by the spring portion 24b. When the first and second shutters 21 and 22 are closed, the locking member 24 gets interlocked with the rotational member 25, thereby regulating the rotation of the rotational member 25. And when the first and second shutters 21 and 22 are closed as a result of the rotation of the rotational member 25, the disc holding portions 21d, 22d and 22c protrude into the disc storage portion. Then, the outer periphery of the second side 100B of the disc 100 is pressed against the bottom of the disc holding portions in the disc storage portion, thereby holding the disc 100 thereon.

According to this preferred embodiment, the disc 100 can be removed from the disc cartridge 302 just by turning the stopper member 33. Also, in storing the removed disc 100 back to the disc cartridge 302 again, just the stopper member 33 needs to be turned to its original position. Thus, the disc can be removed from the disc cartridge more easily.

In the first and second preferred embodiments described above, the stopper member turns within a plane that is defined substantially parallel to the disc. However, the same effects are also achieved even if a structure in which the stopper member turns within a plane substantially perpendicular to the disc or a structure in which the stopper member slides within a plane substantially parallel to the disc is adopted. Furthermore, the same effects are also achievable even if the stopper member is attachable and removable to/from the cartridge body.

Also, the stopper member and the rotational member interlock with each other in the first embodiment and the stopper member, rotational member and locking member interlock together in the second preferred embodiment. However, the structures of interlocking these members are not limited to those described for these preferred embodiments. Alternatively, a known interlocking structure for interlocking either the stopper member and the rotational member or the rotational member and a sliding member may be adopted as well.

Also, in the first and second embodiments described above, the size of the disc 100 is not particularly specified. However, the present invention may be implemented as a disc cartridge for housing a disc having a size of 12 cm or any of various other sizes.

Furthermore, in the first and second embodiments described above, the disc cartridge is illustrated as having an outer dimension that is slightly greater than the size of the disc. However, the size relationship between the disc and the disc cartridge is not limited to the illustrated one. For example, even when the disc cartridge has an outer dimension that is large enough to store a 12 cm disc therein, the disc storage portion and the disc holding portions of the disc cartridge may have their sizes and structures designed in such a manner as to store an 8 cm disc. Such a disc cartridge may be used as an adapter for getting read and write operations performed on an 8 cm disc by a disc drive for reading or writing information on/from a 12 cm disc.

INDUSTRIAL APPLICABILITY

A disc cartridge according to the present invention can be used effectively as a disc cartridge that is designed to open and close shutters by rotating a rotational member so as to be compliant with any of various standards. The present invention is applicable for use in not just disc cartridges for optical disks but also disc cartridges for other storage types of discs such as magnetic disks and magneto-optical disks.

DESCRIPTION OF THE REFERENCE NUMERALS 11 cartridge lower shell
11*m* groove portion
11*d* retaining wall
11*n* cap member
11*k* removal history hole
12 cartridge upper shell
12*s* stopper member
12*w* disc window
21 first shutter
22 second shutter
21*d*, 22*d*, 22*c* disc holding portion
23, 33 stopper member
23*d* hooking portion
24 locking member
24*k* locking end portion
24*s* unlocking portion
25 rotational member
25*k* engaging window
25*m* recess
26 coupling member
26*a* raised portion
26*p* pin portion
33 stopper member
33*p* raised portion
100 disc
100*h* center hole
301, 302 disc cartridge

What is claimed is:

1. A disc cartridge comprising:
 a cartridge body including a disc storage portion and a bottom window, wherein the disc storage portion has a disc window and a bottom and stores a disc, having first and second sides, therein so that the disc is rotatable there and that the first side is exposed through the disc window; and the bottom window is opened through the bottom of the disc storage portion so as to get the disc chucked externally and to allow a head, which reads and/or writes information, to access the second side of the disc;
 at least one shutter, provided on the bottom of the disc storage portion, for opening or shutting the bottom window;
 a rotational member, which is supported by the cartridge body so as to be rotatable therein and is interlocked with the shutter so as to open and close the shutter by rotating itself;
 a disc holding portion for interlocking with the shutter that is opening or closing so as to hold the disc onto either the shutter or the cartridge body when the shutter shuts the bottom window and to release the disc when the shutter opens the bottom window; and
 a stopper member, which is supported by the cartridge body so as to be movable from a position protruding into the disc window to a position not protruding into the disc window, or vice versa,
 wherein the disc holding portion interlocks with the stopper member, and releases the disc when the stopper member has moved to the position not protruding into the disc window.

2. The disc cartridge of claim 1, wherein the stopper member and the rotational member interlock together, thereby interlocking the disc holding portion and the stopper member with each other.

3. The disc cartridge of claim 2, further comprising a coupling member for interlocking the stopper member and the rotational member together.

4. The disc cartridge of claim 3, wherein the coupling member includes first and second engaging portions to engage with the stopper member and the rotational member, respectively, the second engaging portion contacting and engaging with the rotational member while the stopper member is moving.

5. The disc cartridge of claim 4, wherein the first engaging portion of the coupling member is supported by the stopper member so as to be rotatable.

6. The disc cartridge of claim 4, wherein the coupling member is positioned such that the second engaging portion of the coupling member does not contact with the rotational member while the stopper member is protruding into the disc window.

7. The disc cartridge of claim 6, wherein the second engaging portion of the coupling member has a pin portion, and wherein the cartridge body has a groove portion, which fits with the pin portion to define a direction in which the second engaging portion moves.

8. The disc cartridge of claim 1, wherein the cartridge body has a removal history hole, which is cut through the cartridge body, and a columnar cap member, which covers the removal history hole at least partially and which is attached to, but readily removable from, the cartridge body, and wherein the stopper member has a hole to which the cap member is inserted.

9. The disc cartridge of claim 1, further comprising a locking member for locking the rotational member onto the cartridge body while the shutter closes the bottom window.

10. The disc cartridge of claim 9, wherein the stopper member and the locking member interlock together so as to make the locking member unlock the rotational member by moving the stopper member.

11. The disc cartridge of claim 10, wherein the stopper member and the rotational member interlock together, thereby interlocking the disc holding portion and the stopper member with each other.

12. The disc cartridge of claim 11, further comprising a coupling member for interlocking the stopper member and the rotational member together.

13. The disc cartridge of claim 12, wherein the coupling member includes first and second engaging portions to engage with the stopper member and the rotational member, respectively, the second engaging portion contacting and engaging with the rotational member while the stopper member is moving.

14. The disc cartridge of claim 13, wherein the first engaging portion of the coupling member is supported by the stopper member so as to be rotatable.

15. The disc cartridge of claim 14, wherein the coupling member is positioned such that the second engaging portion of the coupling member does not contact with the rotational member while the stopper member is protruding into the disc window.

16. The disc cartridge of claim 15, wherein the second engaging portion of the coupling member has a pin portion, and wherein the cartridge body has a groove portion, which fits with the pin portion to define a direction in which the second engaging portion moves.

17. The disc cartridge of claim 9, wherein the locking member is provided so as to be attachable and removable to/from the cartridge body.

18. The disc cartridge of claims 1, wherein while the stopper member is not protruding into the disc window, the disc holding portion does not protrude into the disc window, either.

19. The disc cartridge of one of claims 1 wherein the stopper member either turns or slides with respect to the cartridge body, thereby taking the position protruding into the disc window or the position not protruding into the disc window.

20. The disc cartridge of claim 1, comprising two shutters including the at least one shutter, wherein the disc holding portion is provided for each of the two shutters.

21. The disc cartridge of claim 20, wherein the disc holding portions hold the disc by pressing at least outer peripheral portions of the second side of the disc against the bottom of the disc storage portion.

22. The disc cartridge of claim 1, wherein the stopper member is provided so as to be attachable and removable to/from the cartridge body.

* * * * *

UNITED STATES PATENT AND TRADEMARK OFFICE
CERTIFICATE OF CORRECTION

PATENT NO. : 7,448,056 B2  
APPLICATION NO. : 10/595636  
DATED : November 4, 2008  
INVENTOR(S) : Hironori Okazawa, Teruyuki Takizawa and Kuniko Nakata Page 1 of 1

It is certified that error appears in the above-identified patent and that said Letters Patent is hereby corrected as shown below:

Column 16, line 10, "claims 1" should read -- claim 1 --.

Column 16, line 14, "one of claims 1" should read -- claim 1 --.

Signed and Sealed this

Second Day of June, 2009

JOHN DOLL  
*Acting Director of the United States Patent and Trademark Office*